United States Patent
Paquet et al.

[19]

[11] Patent Number: 5,921,071
[45] Date of Patent: Jul. 13, 1999

[54] FEEDER ARREST FOR USE IN A HARVESTING MACHINE

[75] Inventors: Bert J.F. Paquet, Brugge; Patrick F. Geladi, Mechelen, both of Belgium

[73] Assignee: New Holland North America, Inc., New Holland, Pa.

[21] Appl. No.: 08/900,589

[22] Filed: Jul. 25, 1997

[30] Foreign Application Priority Data

Jul. 30, 1996 [GB] United Kingdom .................. 9615969

[51] Int. Cl.⁶ .................................................. A01D 75/18
[52] U.S. Cl. ............................. 56/16.6; 56/10.2 J; 56/60; 56/504; 460/3; 241/34
[58] Field of Search ................................ 56/16.6, 10.2 J, 56/51, 52, 60, 71, 500, 504, 505, 156, 198; 460/2, 3; 241/33, 34

[56] References Cited

U.S. PATENT DOCUMENTS

| | | | |
|---|---|---|---|
| 4,193,248 | 3/1980 | Gilleman | 241/34 X |
| 4,296,591 | 10/1981 | Martenas et al. | 56/10.3 |
| 4,353,199 | 10/1982 | Chow et al. | 56/10.2 |
| 5,627,475 | 5/1997 | Strosser | 324/546 |

FOREIGN PATENT DOCUMENTS 0102665  8/1983  European Pat. Off. .

*Primary Examiner*—Terry Lee Melius
*Attorney, Agent, or Firm*—J. William Stader; Larry W. Miller

[57] ABSTRACT

An agricultural harvesting machine, such as a forage harvester, comprises a feeder means for feeding crop material to crop processing means and a feeder arrest means for immediately arresting at least a portion of said feeder means upon detection of a foreign object. Said arrest means comprises a ratchet wheel mounted onto the drive line of said feeder means and an electrical actuator means for loading a pawl into engagement with said ratchet wheel.

The harvesting machine comprises a means for automatically monitoring the good operative condition of the electrical actuator means and the means for generating an alarm signal upon detection of a bad operative condition by said monitoring means. The monitoring means checks the condition of the electrical actuator and its circuitry by applying a voltage thereto during a short interval and monitoring the response during or immediately after said interval. The length of this short interval is chosen to preclude actual engagement of the pawl. This test procedure can be executed automatically at regular intervals.

12 Claims, 4 Drawing Sheets

FEEDER ARREST FOR USE IN A HARVESTING MACHINE

BACKGROUND OF THE INVENTION

1. Field of Art

This invention relates to an agricultural harvesting machine provided with feeder means for feeding harvested crop material to crop processing means. More particularly it relates to feeder arrest means for immediately arresting said feeder means upon detection of foreign objects and means for ensuring the good operative condition of these arrest means.

2. Description of Prior Art

It is well known in the art to provide agricultural harvesting machines, such as forage harvesters, with an apparatus for detecting foreign material in the stream of crop material which is being fed to a crop processing unit, such as a rotating cutterhead, cooperating with a stationary shear bar. Such apparatus may be a metal detector as described in European patent application 0,102,665. The signal generated by this detector is fed to feeder arrest means, which provokes an is immediate stop of the means feeding the crop material to the cutterhead. This prevents stray metal objects, which were picked up from the field, from reaching the cutterhead and causing serious damage to the knives and the shear bar. Portions of damaged knives might even get detached and cause even worse damage to other sections of the crop processing unit or the rest of the harvester.

Conventionally, the feeder arrest means comprises a ratchet wheel mounted on a drive line portion of the feed rolls and a pawl which is positioned to engage this ratchet upon detection of metal. In U.S. Pat. No. 4,296,591, the pawl is pulled towards the ratchet by a spring, while an actuated solenoid is holding the pawl away from the ratchet periphery. Upon detection of a foreign object the current to the solenoid is cut and the spring pulls the pawl into engagement with the ratchet, thereby halting the feed rolls. When an electrical failure would occur in the circuitry to the solenoid, or when the solenoid itself would go out of order, the solenoid will turn passive and the pawl will be activated by the spring. This prevents electrical failures which would pass unnoticed and foreign objects would still be permitted to be grasped by the cutterhead.

In this type of arrest means, the reaction speed and the effectiveness of the pawl are determined by the choice and the pretension of the spring. When such apparatus is used in high capacity harvesters equipped with wide cutterheads, stronger springs are required, which in turn dictate the use of stronger solenoids, having a larger actuation current.

Therefore it has been proposed to reverse the actions of the spring and the solenoid and to make the spring hold the pawl away from the ratchet, while the actuation of the solenoid brings the pawl into engagement with the ratchet wheel. In this configuration the application of a high current to the solenoid is restricted to the actual actuation interval of the feeder arrest means. However, a failure in the solenoid or its circuitry will not be detected, as the spring is still precluding immediate engagement of the pawl with the ratchet wheel. The operator will not be aware of such failures and may still erroneously presume that the harvesting machine is still capable of preventing the ingress of foreign objects.

It therefore is an object of the present invention to provide a feeder arrest means, which on the one hand can be used with large capacity harvesters, and on the other hand comprise safety features, which preclude that a failure to the actuation system of the arrest means would pass unnoticed, so that the harvesting operation might be continued and possible ingress of a foreign is object might cause substantial damage to the cutterhead.

SUMMARY OF THE INVENTION

According to the invention an agricultural harvesting machine is provided, comprising:

- a means for processing harvested crop material;
- a feeder means driven by a drive line for feeding said crop material to said processing means;
- a feeder arrest means for immediately arresting at least a portion of said feeder means, said arrest means comprising:
  - a ratchet wheel mounted onto a portion of said drive line;
  - a pawl means mounted adjacent the periphery of said ratchet wheel; and
  - a pawl actuator means for loading said pawl means into engagement with said ratchet wheel thereby arresting said portion of said feeder means.

This harvesting machine is characterized in that it further comprises:

- a means for automatically monitoring the good operative condition of said pawl actuator means while the latter is not actuated; and
- means generating an alarm signal upon detection of a bad operative condition by said monitoring means.

The actuator means may comprise an electromagnetic coil and a core member which is connected to the pawl means for loading the latter into engagement with the ratchet. The monitoring means may control the condition of the coil and its circuitry by applying a voltage thereto during a short interval and monitoring the good condition during or immediately after said interval. Most advantageously the length of the interval can be chosen to preclude actual engagement of the pawl.

According to one embodiment the monitoring means may comprise a switch means, such as a profet, provided with a diagnosis pin whereof the output is indicative of the status of the coil. The output of this pin may also be monitored during normal actuation of the pawl, upon detection of a foreign object, in order to establish the further good operative condition of the arrest means. This additional use is provided at no extra hardware costs.

According to another embodiment the monitoring means may monitor an effect of the emf generated by the coil when the voltage applied thereto is cut at the end of the short interval. Most advantageously this effect is measured via an opto-coupler device, comprising a LED and a sensor actuatable by the light emitted by the LED. This arrangement precludes damage to the control circuitry of the feeder arrest means by the negative electrical pulses generated by the coil.

This control circuitry may be constituted by a computer means, comprising a micro-processor and memory means, loaded with a program which is executed at regular intervals, to monitor the operative condition of the actuator.

BRIEF DESCRIPTION OF THE DRAWINGS

An agricultural harvesting machine in accordance with the present invention will now be described in greater detail, by way of example, with reference to the following drawings, in which.

DETAILED DESCRIPTION OF THE INVENTION

The terms "front", "rear", "forward", "rearward", "right" and "left" used throughout this specification are determined with respect to the normal direction of movement of the machine in operation and are not to be construed as limiting terms.

Figure 1:
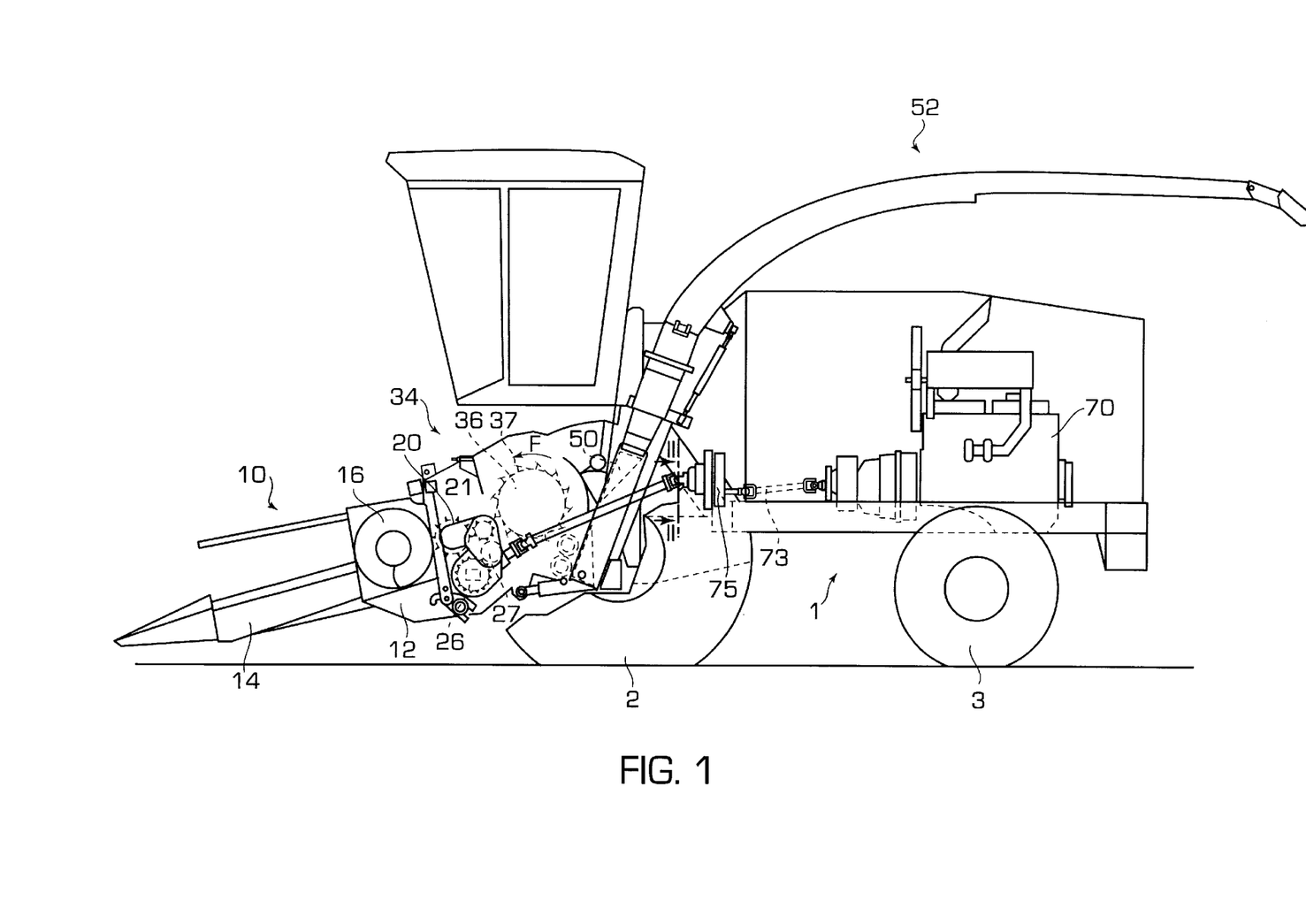
FIG. 1, is a schematic, side elevational view of a forage harvester, comprising a feed roll unit equipped with a metal detector, and a drive arrest apparatus for stopping the motion of said feed roll unit.

In FIG. 1, there is shown a forage harvester having a main frame 1 on which there are mounted ground engaging traction wheels 2 and steering wheels 3. The forage harvester is shown equipped with a crop collecting apparatus, in the form of a row crop attachment 10, suitable for the harvesting of maize, but which can be replaced with a conventional windrow pick-up device or a conventional cutter bar attachment, depending on the type of crop to be harvested. Customarily, the row crop attachment 10 comprises an attachment frame 12, which supports a plurality of row crop units 14, operable to harvest maize stalks from the field and to convey the same rearwardly to an auger 16, which in turn delivers the crop material to the bite of feeder means installed in a front unit of the forage harvester.

Said feeder means comprises a lower feeder means, including a forward lower feedroll 26, and a smooth, rear lower feedroll 27, and an upper feeder means, including an upper forward feedroll 20 and an upper rear feedroll 21. Said upper and lower feeder means rotate to convey the crop material between to a cutterhead 36, which is mounted within a cutterhead frame 34 and comprises a plurality of knives 37, generating a cylindrical peripheral shape or profile, when the cutterhead 36 is rotated.

During normal harvesting operation, when the cutterhead 36 is rotated in its normal operation sense, as indicated by arrow F in FIG. 1, the knives 37 cooperate with a fixed shearbar to cut the crop material to length and to project it to a blower rotor 40 which is installed within a blower housing 38. The blower rotor 40 comprises a plurality of paddles, which throw the material upwardly through the blower outlet into a discharge spout 42, which can be positioned by an operator to direct the cut crop material as required, normally into a wagon which is moving alongside or behind the forage harvester.

The forage harvester is driven by a power plant or engine 44, which is drivingly connected to a power-take-off (PTO) gearbox 45. The output shaft of the PTO gearbox 45 is linked to a drive shaft 46, which is connected to an input shaft of the transmission 47. An output shaft of this transmission provides via a safety clutch 48 and a drive shaft 52 motive power to a lower feedroll transmission 54 on the left hand side of the front unit. This transmission 54 is connected directly to the lower feedrolls 26, 27 and through a drive shaft (not shown) to the upper feedroll transmission 56, drivingly interconnecting the upper feedrolls 21, 20.

The front unit of the forage harvester is equipped with an apparatus 58 for detecting the presence of foreign bodies in the flow of crop material to the rotating cutterhead 36. This apparatus 58 may be installed inside the forward lower feedroll 26 as shown in FIG. I or at any other convenient place along the path of the crop material to the cutterhead 36. The detecting apparatus 58 illustrated is a metal detector of the type described in U.S. Pat. No. 5,627,475. However the drive arrest apparatus of the invention may equally be used with a hard object detector of the type described in U.S. Pat. No. 4,353,199. Upon detection of a foreign object the apparatus 58 generates a signal to actuate a quick stop apparatus 60 which is mounted on the drive line to the feedrolls 20, 21, 26, 27.

Figure 2:
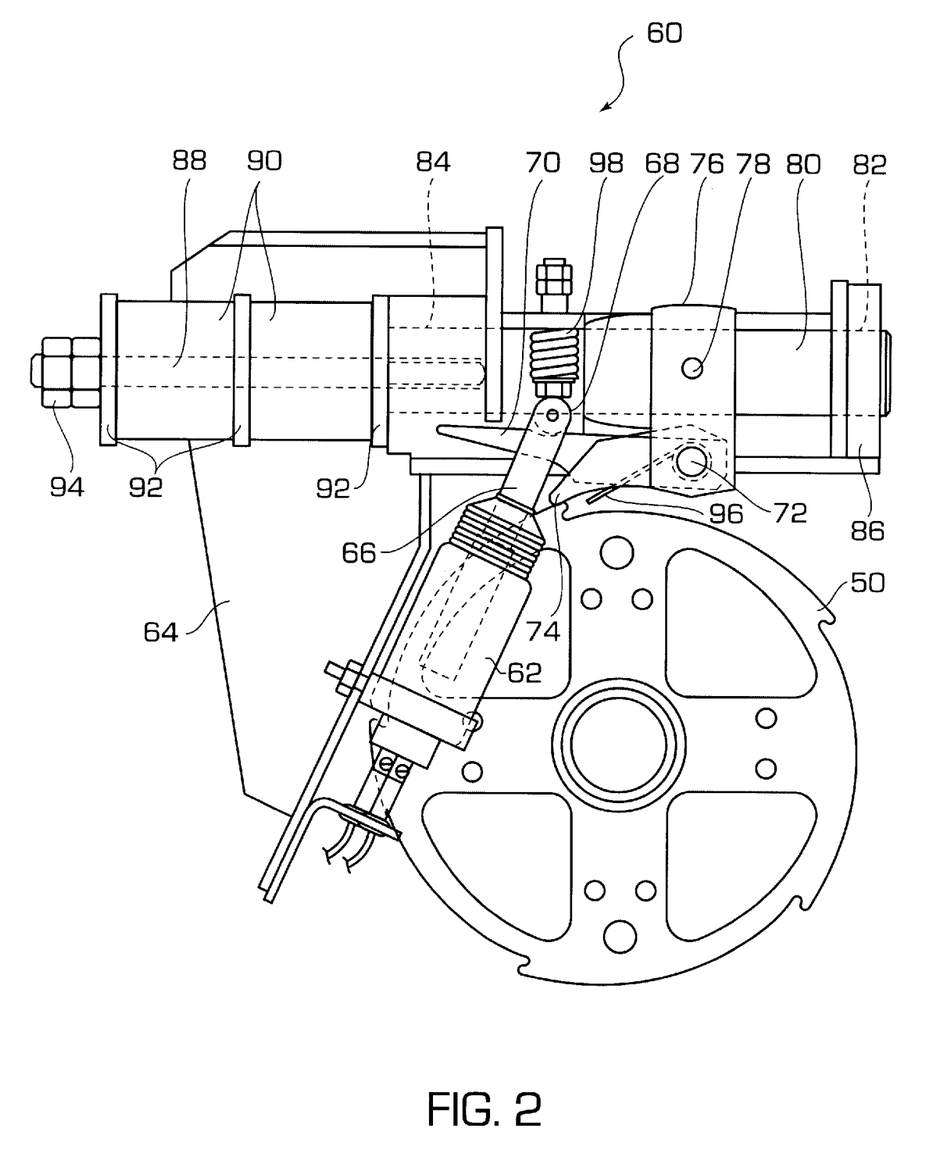
FIG. 2 is an enlarged front view of the drive arrest apparatus, taken along lines II—II of FIG. 1.

As shown in FIG. 2, the quick stop apparatus 60 comprises an electrical actuator, including a solenoid coil 62 which is affixed to a support plate 64 mounted on the transmission 47. A core member 66 is installed for sliding movement in the coil 62. The upper end of the core member 66 has a slot for receiving a horizontally extending finger 70. The upper edge of the finger 70 is engaged by a roller 68 which is rotatably connected to the core member 66.

The finger 70 is affixed to a pawl 74 and can be pivoted in unison about a pin 72 extending through an extension of a collar 76, which is secured by a pin 78 to a cylindrical slide 80. Both ends of the slide 80 are received in bores 82, 84 of a support structure 86 attached to the support plate 64. An extension rod 88 is screwed in the right hand end of the slide 80 (left hand end as seen in FIG. 2) for carrying a pair of elastomeric members 90 mounted between steel plates 92. The collar 76 is pulled against the support structure 86 by a pair of nuts 94 thereby simultaneously loading the elastomeric members 90.

Below the pawl 74 a ratchet wheel 50 is mounted onto the driving portion of the safety clutch 48, which is connected to the drive shaft 52. The pawl 74 and the finger 70 are forced upwardly and away from the ratchet wheel 50 by a torsion spring 96 which is mounted over the pivot pin 72. The finger 70 lifts the core member 66 of the actuator and holds it against a spring assembly 98 which is attached to the support structure 86.

When the apparatus 58 detects a foreign object in the crop flow to the cutterhead 36, a computer means, described hereafter, applies an electrical current to the solenoid 62, thereby generating an magnetic field which pulls the core member 66 inwardly. The finger 70 and the pawl 74 are pivoted towards the periphery of the ratchet wheel 50. When the pawl 74 engages one of the ratchet teeth, the wheel 50 and the driving portion of the safety clutch 48 are arrested immediately. The feedrolls 20, 21, 26, 27 are stopped by the drive shaft 52 which is also affixed to said driving portion. The safety clutch 48 disengages such that its driven portion may still rotate freely under action of the engine 44 and the transmission 47.

The shock on the pawl 74 is absorbed by the elastomeric members 90 which are compressed by the movement of the collar 76 and the slide 80. During this movement the roller 68 travels over the edge of the finger 70 to hold the pawl 74 down against the force of the torsion spring 96 and to ensure constant engagement of the pawl tip with the periphery of the ratchet wheel 50.

Figure 3A:
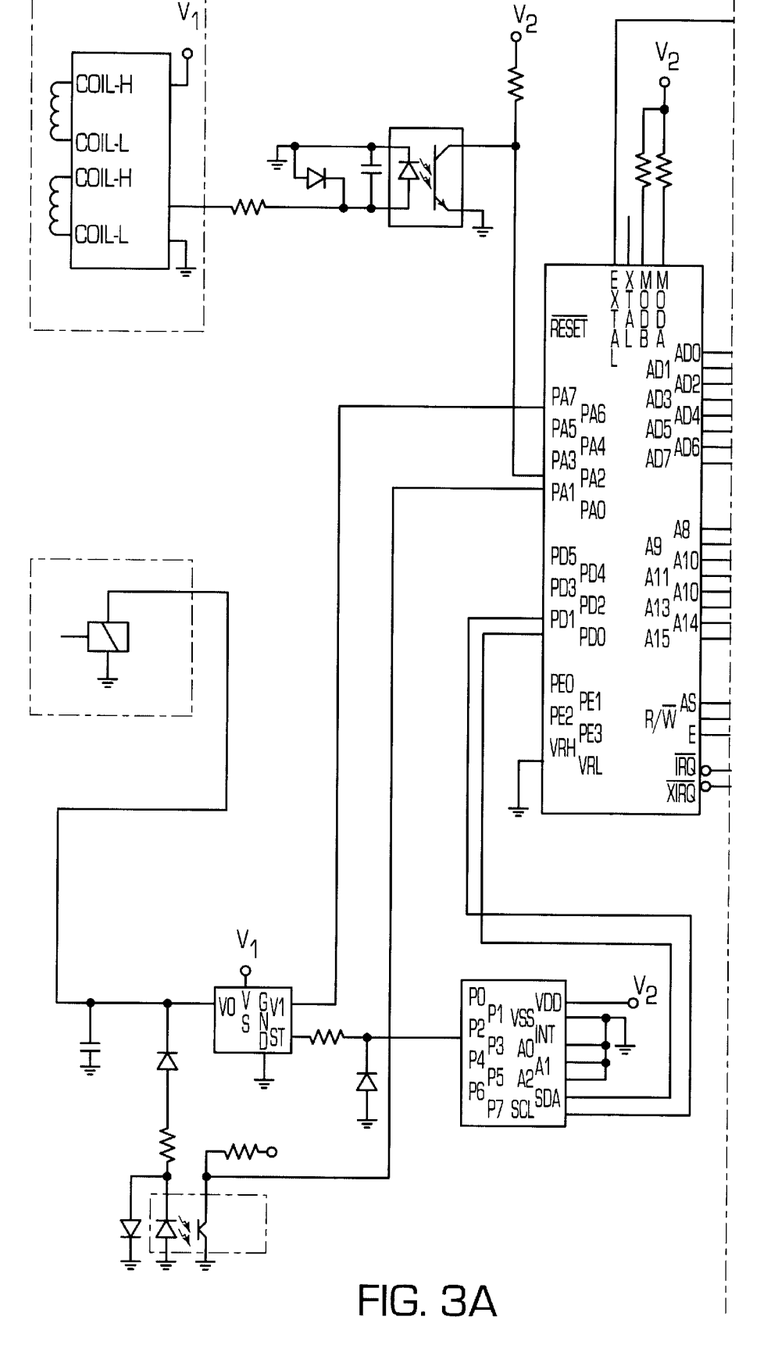
FIGS. 3A and 3B, when placed together along the phantom lines, form a simplified circuit diagram used in explaining the operation and the testing of the drive arrest apparatus.
Figure 3B:
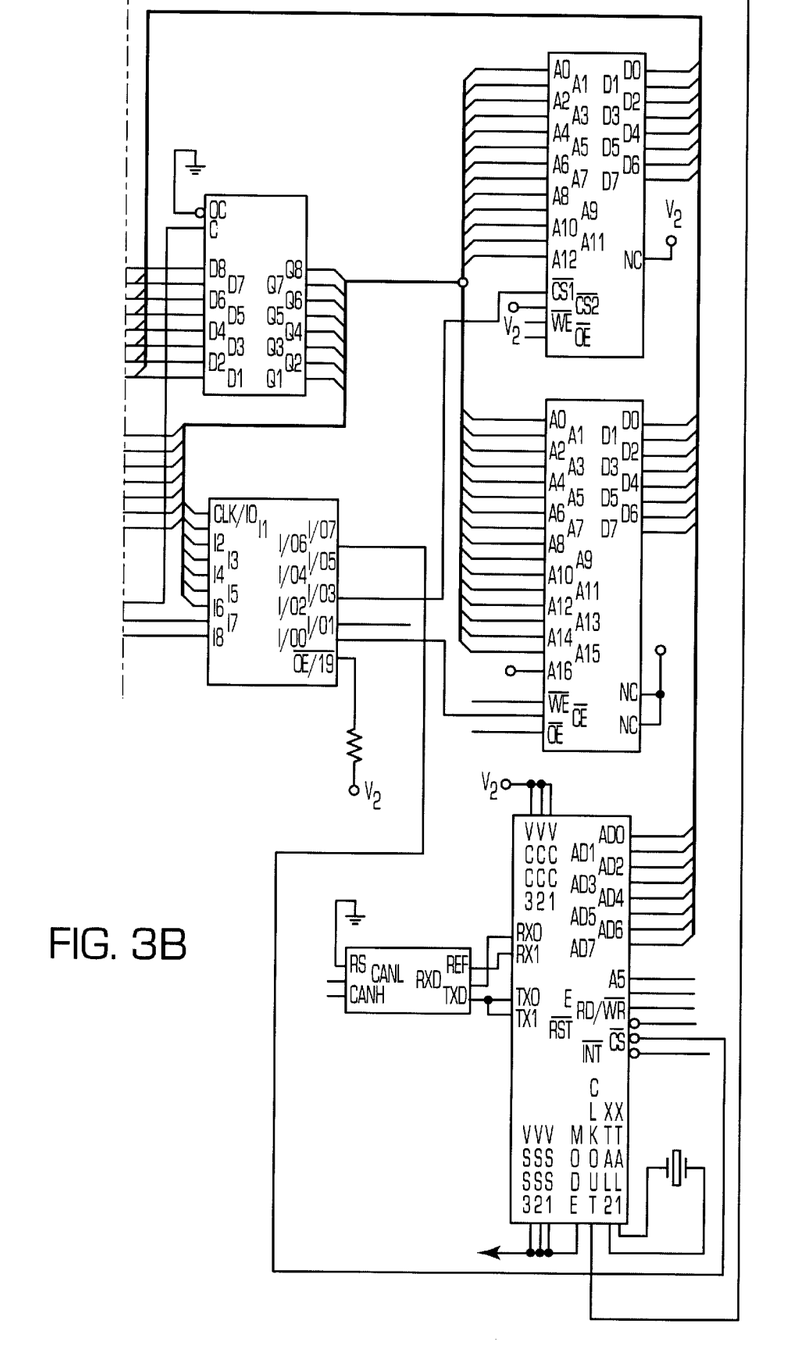

A simplified circuitry for controlling the drive arrest apparatus is shown in FIG. 3. The metal detector apparatus 58 comprises a pair of coils 100 arranged around a set of permanent magnets. The presence of a metal object in the crop flow causes a variation in the magnetic field of these magnets, which induces an emf across the coils. Circuitry 102 as described in U.S. Pat. No. 5,647,475 is linked to the coils for capturing the voltage variations and generating a high output signal when a metal object is detected. This signal is fed to an opto-coupler device 104, comprising a LED and photo-sensitive transistor which is linked to an input pin PA2 of a micro-processor 106. Normally the input to this pin will be high. Detection of metal will trigger the transistor of the device 104 and short the input pin PA2 to ground. The opto-coupler device may be of the type ILQ1 provided by Siemens.

The micro-processor 106 may be a 68HC11EX microprocessor of Motorola. It is linked by a data bus 108 and an address bus 110 to a RAM memory 112 and an erasable ROM memory 114. The RAM memory may be a conventional RAM memory such as the Motorola MB8464A. The erasable memory may be a flash EPROM memory such as the 29F010 supplied by AMD.

The micro-processor 106 is operable to select addresses and chips through a latch means 116 and a chip selector 118. The latch means 116 may be CMOS buffer 74HC573 of Motorola and the chip selector a Gate Array Logic 16V8.

The circuitry shown in FIG. 3 can be used in a decentralized control system, wherein a plurality of microprocessors, interconnected by a high-speed network, control various settings of the harvester. The micro-processor 106 exchanges network data via the data bus 108 and a controller area network (CAN) interface 120. The latter is linked by a transmitter-receiver unit 122 to CAN lines 124. The CAN network can be used to provide messages and warnings to the operator in the cab 43 or to monitor commands given by the same. The interface 120 may be a Philips interface PCA82C200P and the unit 122 may be a Philips transceiver PCA82C250.

Upon detection of a metal object by the metal detector apparatus 58, the micro-processor 106 generates at an output pin PA6 a high signal to an electronic switch means 126 for connecting a voltage source $V_1$ to the coil 62 of the quick stop apparatus 60. The switch means 126 is a smartfet, provided with diagnostic means, such as the Profet BTS432D of Siemens. It has a status pin ST which is high during normal actuation of the coil 62, but which is low under abnormal load, such as caused by a short circuit to ground or by a broken electrical lead. The output of the status pin ST may be fed directly to an input pin of the microprocessor 106 or, as illustrated in FIG. 3, via a digital gate chip 128 and a serial network, comprising lines 130, to input pins PD0, PD1 of the same micro-processor 106. This serial network may be a I²C network and the chip 128 may be of the type PCF8574 manufactured by Philips.

The circuitry further comprises a means for sensing the negative pulse which is generated by the coil 62 when the switch means 126 cuts the electrical current to the coil. The sensing means comprises a connection between the coil and ground, provided with a diode 132 and an opto-coupler 134. The light-emitting diode 135 of the opto-coupler connects the diode 32 to ground and directs a light pulse to its transistor 136 when a negative voltage pulse is induced in the coil 62 and current is flowing from ground though the diodes 135, 132 to the coil. The collector of transistor 136 is via a load resistor to voltage source $V_2$. The collector is directly linked to an input pin PA1 of the micro-processor 106. As long as the electrical actuator is not deactivated the micro-processor will sense a high input, but when the switch means 126 interrupts the current supply to the coil 62, the pulse through the opto-coupler 134 will connect the input pin PA1 to ground. The use of this optical connection prevents substantial electrical pulses generated by the coil from being transmitted to the remainder of the circuitry, where they might wreck the electronic components.

The operation of the drive arresting apparatus is controlled by a pawl routine as set forth in the attached Appendix 1. This routine is stored into the ROM memory 114 and is fetched by the micro-processor 106. The pawl routine is executed on an interrupt basis every 50 msec.

The computer means first checks the status of the flag pawl_puls_on, which is set by an interrupt routine upon actual detection of metal by the apparatus 58. The electrical actuator may only be activated for a short period which may be in the order of 0.5 sec, which on the one hand suffices for realizing a positive stop of the feedrolls 20, 21, 26, 27 and on the other precludes damages caused by over-heating of the coil 62. If the flag pawl_puls_on is set and the pawl activation period has not expired yet, the routine fetches from the I²C network 130 the value of IN_PAWL_L2, representing the status of the switch means 126, to see whether any anomalies in the circuitry have arisen. In case a deficiency is found, the pawl routine resets the output pin PA6 for temporarily interrupting the current to the coil 62. Thereafter the switch 126 is activated again to resume the actuation of the stop apparatus 60. The routine loads a CAN message indicative of the pawl action into the CAN lines 124 for generating a warning to the operator and automatically disengaging a portion of the drive line to the feedrolls 20, 21, 26, 27. Then a pawl hold timer is incremented.

When the timer test at the beginning of the pawl routine reveals that the pawl activation period has expired, the output pin PA6 is reset to cut the current to the coil 62 and release the pawl 74.

In case that no foreign object has been detected or that the pawl activation period has expired the pawl routine immediately proceeds to a test routine which first resets the pin PA6 and the pawl hold timer. A flag metal_detector is checked to see whether the metal detecting apparatus 58 is operative. In case it is not, the pawl test timer is set to a value indicating the expiration of a interval of 5 sec between two consecutive pawl tests, such that the operability of the system may be tested immediately after the detecting apparatus 58 has been switched on.

If the metal_detector flag indicates that this apparatus 58 was operative already, the routine checks the value of the test timer to see whether the 5 sec interval between consecutive pawl tests has expired already. In case this interval has not expired yet, the test timer is incremented and the routine is terminated.

Upon expiration of the interval, the routine proceeds to an actual pawl test, wherein the pawl mechanism is activated during a test time of 4 msec. This period is not long enough to achieve a proper motion of the core member 66 into the coil 62, but it suffices to assess the condition of the circuitry controlling the current to the coil.

At first the test timer is reset and the pin PA6 of the micro-processor is set to actuate the switch means 126. Then 750 clock pulses are counted for providing a time delay of 1.5 msec, necessary for the switch means 126 and the circuitry to the coil 62 to stabilize. Thereafter a pawl failure flag is set and the interrupt routine, which might otherwise interfere with the output settings of the micro-processor 106 is disabled.

The test routine then fetches for three consecutive times the value of the status pin of the switch means 126 from the serial network. If during at least one of these three checks the fetched value is low, corresponding to a high output of the status pin, the pawl failure flag is reset. In case the value remains high during the three checks, as a result of a failure such as an open circuit or a short to ground, the failure flag remains set. Thereafter the interrupt routine is enabled again.

Each loading and checking of the status value takes about 0.5 msec, such that the total interval during which the pawl mechanism was actuated, amounts to about 4 msec.

An intermediate detection of a foreign object by the apparatus 58 may have set the flag pawl_puls_on during the foregoing test procedure. The pawl routine checks this flag and disables the switch means 126 only in case this flag is low. Otherwise the coil 62 remains activated at the end of the pawl routine.

The pawl failure flag is checked in another routine which is not described herein in further detail for generating an error message to the operator in the cab 43.

Another pawl routine is disclosed in Appendix 2. Most portions of this routine are equal to the routine of Appendix 1 and will not be discussed hereafter in order to prevent unnecessary repetition. The only difference lies in the actual pawl test which is executed after expiration of the 5 sec interval between consecutive tests.

The pawl routine then resets the test timer and sets the pin PA6 gate of the micro-processor 106 to actuate the switch means 126. Then the computer means count 2000 clock pulses for providing a coil actuation interval of 4 msec. Thereafter the flag pawl_puls_on is checked to see whether the metal detecting apparatus 58 has detected a foreign body in the crop flow. In case it has, the coil remains actuated to pull the pawl 74 against the ratchet wheel 50 and to stop the feedrolls 20, 21, 26, 27.

In the opposite case, the switch means 126 is disabled to cut the current to the coil 62. The flag pawl_puls_on is checked once more and the switch means 126 is actuated again in case this second check reveals an intermediate metal detection.

When no metal is detected, the routine proceeds from the solenoid break to the step in which the pawl failure flag is set. Then the input pin PA6 is checked for three consecutive times. When no deficiencies have occurred in the coil circuit, the interruption of the current to the coil 62 will generate a negative emf pulse at its connection to the switch means 126 and a short current will flow from ground through the opto-coupler 134 to the coil 62.

The pawl routine checks the input pin PA1, which is linked to the opto-coupler, for three times for verifying whether any voltage pulse has occurred. In case at least one of these checks reveals that such pulse has been generated, the pawl failure flag is reset and the pawl routine is terminated. When the input to the pin PA1 remains high during these checks, also the pawl failure flag remains high at the end of the routine.

This flag may be checked in another routine for generating an error message to the operator in the cab 43. Thus may be detected a possible coil circuit failure, such as a short circuit or a broken coil 62.

Although the present invention has been described with respect to a forage harvester and a metal detector, other embodiments can be thought of without departing however from the original idea of the invention.

For example, one may consider to replace the metal detecting apparatus 58 with another type of foreign object detector, such as a stone detector. It is also conceivable to install the present quick stop apparatus in other types of crop processing machinery such as those comprising crop compressing rolls. The quick stop apparatus 60 may be installed on another portion of the drive line of the feeder means to cause immediate arrest of only one or two of the feedrolls.

---

APPENDIX 1

```
/* Pawl routine executed every 50 msec */
#define PAWL_ON_TIME      10 /* unit 50 msec => 0.5sec */
#define PAWL_TEST_TIME   100 /* unit 50 msec => 5sec */
void active_and_passive_pawl()
{
    char              i;
    static char       pawl_test_timer = PAWL_TEST_TIME;
    static char       pawl_hold_timer;
    static char       input_debounce_timer = 0;
    extern char       pawl_puls_on;
    extern char       inputs[N_INPUTS];
    extern char       pawl_failure;
    extern char       metal_detector;
    extern unsigned int  can_data[ID][WORDNO];
        /* Normal routine to activate the pawl on alarm. When metal detected the */
        /* interrupt routine makes pawl_puls_on = 1 and activates the pawl.      */
        if ((pawl_hold_timer < PAWL_ON_TIME) && (pawl_puls_on))
        {
            if (inputs[IN_PAWL_L2_STATUS])       /* retry on profet */
            {
                PORTA &= ~0x40;PORTA &= ~0x40;
                PORTA &= ~0x40;PORTA &= ~0x40;
            }
            PORTA |= 0x40;                        /* PAWL L2 */
            can_data[ID_NODE_D_OUTPUTS - BASE_ID][WORD_PAWL_L2] |= BIT_PAWL_L2;
            pawl_hold_timer++;
            if (pawl_hold_timer >= PAWL_ON_TIME)  /* pawl active timer */
            {
                pawl_hold_timer = 0;
                pawl_puls_on = 0;
                PORTA &= ~0x40;
            }
        }
        else        /* Pawl test routine, executed when pawl is not activated */
        {
            if (PORTA & 0x40) PORTA &= ~0x40; /* security for interrupt routine */
            pawl_hold_timer = 0;
```

-continued

APPENDIX 1

```
if (metal_detector == ON) /* check pawl routine if metal detector = ON */
{
    if (pawl_test_timer < PAWL_TEST_TIME) pawl_test_timer++;
    else
    {
        /* Pawl activated for 4msec. Meanwhile after 1.5msec the profet flag */
        /* is checked for three consecutive times. If one sample says the    */
        /* pawl is connected, test succeeded.                                */
        pawl_test_timer = 0;
        PORTA |= 0x40;
        TOC3 = TCNT + 750;              /* 1,5msec pulse delay status flag */
        TFLG1 = 0x20;
        while (!(TFLG1 & 0x20));
        pawl_failure = 1;
        disable_interrupt();
        for(i= 0; i < 3; i++)
    {
        if (pawl_status_flag()) pawl_failure = 0;
    }
        enable_interrupt();
        if (!(pawl_puls_on))    /* 'if' real int. do not proceed test. */
        {
            PORTA &= ~0x40;
            if (pawl_puls_on)
            {
                PORTA |= 0x40;   /* int. was during previous instruction */
            }
        }
    }
}
else
{
    pawl_test_timer = PAWL_TEST_TIME;   /* if metal detector OFF, no pawl */
    pawl_failure = 0;                   /* no error generation.           */
}
}
```

APPENDIX 2

```
/* Pawl routine executed every 50 msec */
#define PAWL_ON_TIME        10 /* unit 50msec => 0.5sec */
#define PAWL_TEST_TIME     100 /* unit 50msec => 5sec */
void active_and_passive_pawl()
{
    char             i;
    static char      pawl_test_timer = PAWL_TEST_TIME;
    static char      pawl_hold_timer;
    static char      input_debounce_timer = 0;
    extern char      pawl_puls_on;
    extern char      inputs[N_INPUTS];
    extern char      pawl_failure;
    extern char      metal_detector;
    extern unsigned int  can_data[ID][WORDNO];
        /* Normal routine to activate the pawl on alarm. When metal detected the */
        /* interrupt routine makes pawl_puls_on = 1 and activates the pawl.      */
        if ((pawl_hold_timer < PAWL_ON_TIME) && (pawl_puls_on))
        {
            if (inputs[IN_PAWL_L2_STATUS])       /* retry on profet */
            {
                PORTA &= ~0x40;PORTA &= ~0x40;
                PORTA &= ~0x40;PORTA &= ~0x40;
            }
            PORTA |= 0x40;                              /* PAWL L2 */
            can_data[ID_NODE_D_OUTPUTS - BASE_ID][WORD_PAWL_L2] |= BIT_PAWL_L2;
            pawl_hold_timer++;
            if (pawl_hold_timer >= PAWL_ON_TIME)    /* pawl active timer */
            {
                pawl_hold_timer = 0;
                pawl_puls_on = 0;
                PORTA &= ~0x40;
            }
        }
        else        /* Pawl test routine, executed when pawl is not activated*/
        {
```

-continued

APPENDIX 2

```
            if (PORTA & 0x40) PORTA &= ~0x40; /* security for interrupt routine */
            pawl_hold_timer = 0;
            if (metal_detector == ON) /* check pawl routine if metal detector = ON */
            {
                    if (pawl_test_timer < PAWL_TEST_TIME) pawl_test_timer++;
                    else
                    {
                    /* Pawl activated for 4msec. Then on the falling edge there will be    */
                    /* low signal on PORTA & 0x02; this signal is checked for three         */
                    /* consecutive times. If one sample says the pawl is connected,         */
                    /* test succeeded.                                                       */
                    pawl_test_timer = 0;
/* ON */ PORTA |= 0x40;
                            TOC3 = TCNT + 2000;                    /* 4msec pulse on PAWL L2 */
                            TFLG1 = 0x20;
                            while (!(TFLG1 & 0x20));
/* OFF */ if (!(pawl_puls_on))            /* 'if' real int. do not proceed test. */
                            {
                                    PORTA &= ~0x40;
                                    if (pawl_puls_on)
                                    {
                                            PORTA |= 0x40;    /* int. was during previous instruction */
                                    }
                            }
                            pawl_failure = 1;
                            for (i = 0; i < 3; i++)
                            {
                                    if (!(PORTA & 0x02)) pawl_failure = 0;
                            }
                    }
            }
            else
            {
                    pawl_test_timer = PAWL_TEST_TIME;    /* if metal detector OFF, no pawl */
                    pawl_failure = 0;                    /* no error generation.           */
            }
    }
}
```

What is claimed is:

1. An agricultural harvesting machine comprising:
   a. a means for processing harvested crop material;
   b. a feeder means driven by a drive line for feeding said crop material to said processing means;
   c. a feeder arrest means for immediately arresting at least a portion of said feeder means, said arrest means comprising:
   d. a ratchet wheel mounted onto a portion of said drive line;
   e. a pawl means mounted adjacent the periphery of said ratchet wheel; and
   f. pawl actuator means for loading said pawl means into engagement with said ratchet wheel thereby arresting said portion of said feeder means;
   g. said agricultural harvesting machine being characterized in that said harvesting machine further comprises:
   h. a means for automatically monitoring the good operative condition of said pawl actuator means;
   i. a means for generating an alarm signal upon detection of a bad operative condition by said monitoring means;
   j. the pawl actuator means further comprises an electromagnetic coil and a core member movable therein and connected to the pawl means for loading said pawl means into engagement with said ratchet wheel when an electrical current is applied to said coil; and
   k. the monitoring means further comprising a means for applying a voltage to said coil during a short interval and said monitoring means monitors the good operative condition of said actuator means during or immediately after said short interval.

2. An agricultural harvesting machine according to claim 1 wherein the length of said short interval precludes the engagement of said pawl means with said ratchet wheel.

3. An agricultural harvesting machine according to claim 2, wherein said monitoring means monitors the current applied to said coil during said short period and generates an alarm signal whenever said coil is short-circuited or the lead thereto is open.

4. An agricultural harvesting machine according to claim 3, wherein said monitoring means further comprises a switch means for applying a voltage to said coil upon actuation by a switch signal to a input pin and further comprising a diagnosis pin producing an output which is indicative of the value of the current supplied by the switch means to said coil.

5. An agricultural harvesting machine according to claim 4, wherein said switch means is a smartfet and said monitoring means further comprises a micro-processor which is linked to the input pin of said smartfet.

6. An agricultural harvesting machine according to claim 5, wherein said monitoring means monitors an effect of an emf generated by said coil when a voltage applied thereto is cut at the end of said short interval.

7. An agricultural harvesting machine according to claim 6, wherein said monitoring means further comprises a grounded light emitting diode, which is connected to said coil for enabling a current flow therethrough when said emf is generated and a sensor means actuatable by the light emitted by said diode.

8. An agricultural harvesting machine according to claim 7, wherein said diode and said sensor means are combined in an opto-coupler and in that said monitoring means further comprises a micro-processor which is linked to the said sensor means.

9. An agricultural harvesting machine according to claim 8, wherein said monitoring means applies a voltage to the coil and monitors the good operative condition of the pawl actuator means at regular time intervals.

10. An agricultural harvesting machine according to claim 9, further comprising a detecting apparatus for detecting the presence of foreign objects in the flow of crop material to the crop processing means and upon detection of said objects, said monitoring means apply a voltage to the coil during a long time interval, sufficiently long to cause the engagement of the pawl means with the ratchet wheel.

11. An agricultural harvesting machine according to claim 10, wherein said monitoring means monitors the good operative condition of said actuator means during said long time interval.

12. An agricultural harvesting machine according to claim 11, wherein said machine is a forage harvester, comprising a rotatable cutterhead for processing crop material and said feeder means comprises at least one rotatable feedroll which is arrested by said feeder arrest means.

* * * * *